(12) United States Patent
Portman (10) Patent No.: US 6,429,190 B1
(45) Date of Patent: *Aug. 6, 2002

(54) METHOD FOR EXTENDING THE SATIETY OF FOOD BY ADDING A NUTRITIONAL COMPOSITION DESIGNED TO STIMULATE CHOLECYSTOKININ(CCK)

(75) Inventor: Robert Portman, Woodbridge, NJ (US)

(73) Assignee: PacificHealth Laboratories, Inc., Woodbridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/737,686

(22) Filed: Dec. 15, 2000

(51) Int. Cl.⁷ .............................................. A01N 37/18
(52) U.S. Cl. ............................ 514/2; 514/773; 514/775
(58) Field of Search ........................... 424/725; 426/72, 426/648, 656, 677, 801; 514/2, 773, 775

(56) References Cited

U.S. PATENT DOCUMENTS

| | | | |
|---|---|---|---|
| 4,491,578 A | 1/1985 | Peikin | |
| 4,833,128 A | 5/1989 | Solomon et al. | |
| 4,970,207 A | 11/1990 | Sato et al. | |
| 5,086,042 A | 2/1992 | Rosamond | |
| 5,187,154 A | 2/1993 | Phillips et al. | |
| 5,290,808 A | 3/1994 | Sofia | |
| 5,314,886 A | 5/1994 | Becker et al. | |
| 5,382,664 A | 1/1995 | Sato et al. | |
| 5,470,839 A | 11/1995 | Laughlin et al. | |
| 5,556,969 A | 9/1996 | Chambers et al. | |
| 5,609,904 A * | 3/1997 | Koh et al. ................. | 426/565 |
| 5,674,896 A | 10/1997 | Yoshida et al. | |
| 5,688,547 A | 11/1997 | Ritchey et al. | |
| 5,703,052 A | 12/1997 | Deninno et al. | |
| 5,739,106 A | 4/1998 | Rink et al. | |
| 5,750,353 A | 5/1998 | Kopin et al. | |
| 5,814,316 A | 9/1998 | Cook et al. | |
| 5,827,517 A | 10/1998 | Cook et al. | |
| 5,849,708 A | 12/1998 | Maratos-Flier | |
| 5,932,561 A | 8/1999 | Meyers et al. | |
| 5,989,584 A | 11/1999 | Cook et al. | |
| 6,039,985 A * | 3/2000 | Kamarei ....................... | 426/72 |
| 6,057,109 A | 5/2000 | Tartaglia | |

FOREIGN PATENT DOCUMENTS

WO    WO 0022937    4/2000

OTHER PUBLICATIONS

Ultra Slim–Fast with Soy Protein Water Mixable Shake; World Wide Web, http://www.wlim–fast.com/shared/soy.asp, pp. 1–2, Accessed Jul. 6, 2001.*

* cited by examiner

Primary Examiner—Jon P. Weber
Assistant Examiner—Patricia Patten
(74) Attorney, Agent, or Firm—Gibbons, Del Deo, Dolan, Griffinger & Vecchione (57) ABSTRACT

A nutritional composition for adding to food for enhancing and extending the satiety of the food by stimulating CCK levels in a calorically efficient manner and for reducing weight. The nutritional composition includes long chain fatty acids ($C_{12}$ to $C_{18}$) being in the range of 1.0 to 6.0 grams by weight of the composition; a calcium source being in the range of 1.0 to 4.0 grams by weight of the composition; potato fiber being in the range of 1.0 to 6.0 grams by weight of the composition; whey protein enriched with glycomacroprotein being in the range of 1.0 to 5.0 grams by weight of the composition; glucomannan fiber being in the range of 0.5 to 4.0 grams by weight of the composition; and alfalfa being in the range of 0.05 to 3.0 grams by weight of the composition. The food is selected from the group consisting of carbohydrates, proteins and fats.

37 Claims, 6 Drawing Sheets

METHOD FOR EXTENDING THE SATIETY OF FOOD BY ADDING A NUTRITIONAL COMPOSITION DESIGNED TO STIMULATE CHOLECYSTOKININ(CCK)

FIELD OF THE INVENTION

The present invention relates to a calorically efficient method for extending and enhancing the satiation quality of food. More particularly, the method includes addition to food of a nutritional composition containing a protein source, long chain fatty acids, and calcium to stimulate the release of cholecystokinin (CCK). Further, the nutritional composition includes soluble and insoluble fibers to bind bile salts that inhibit the release of CCK. By enhancing the satiation quality of food, the nutritional composition decreases food intake producing weight loss over time.

BACKGROUND OF THE INVENTION

It is well known in the art that specific nutritive agents can produce varying degrees of satiety following consumption. For example, it has been shown that a meal high in fat will produce a greater degree of satiety than an equal calorie meal that is high in carbohydrate. This has important implications for weight loss and weight management. The only proven way to lose weight is to either decrease caloric consumption or increase energy expenditure. For the most part, individuals on a weight loss program reduce their daily caloric consumption by decreasing the amount of fat and by increasing the amount of carbohydrate in their diet. This is logical because fat is an energy dense food (9 kcal/g) compared to carbohydrate (4 kcal/g). Although this regimen reduces total caloric intake, it may increase subjective feelings of hunger because carbohydrate is not as satiating as fat. Over time this can result in reduced compliance and diet failure. The challenge is how to make individuals on a reduced calorie, high carbohydrate diet feel less hungry between meals so they eat less and better comply with their diet regimen.

To address this problem, a number of modalities are used. This includes eating smaller meals more frequently as well as using specific pharmacologic agents that work on the brain neurotransmitters that effect appetite. Because these pharmacologic agents act non-specifically they have been shown to produce a variety of stimulant side effects involving the central nervous and cardiovascular systems.

An alternative approach would be to activate the body's own satiety pathway. Previous studies have shown that a powerful mechanism for extending satiety is through the stimulation of cholecystokinin (CCK). CCK is a peptide released following the consumption of food. Cholecystokinin is a major satiety signal in humans. Individuals, when administered CCK by injection, decreased caloric intake 16–22%. Although the full mechanism whereby CCK exerts is effect on satiety is not known, there appears to be two components, a central component involving CCK receptors in the brain and a peripheral component involving the stomach and small intestine.

When food is consumed, CCK releasing protein (CCKRP) is released in the small intestine. CCKRP stimulates CCK release from intestinal cells. The release of CCK generates the behavioral symptoms associated with satiety and at the same time activates a number of negative feedback mechanisms to turn off the CCK response. There are primarily two negative feedback mechanisms, one involving proteases secreted by the pancreas and the second bile salts released from the gallbladder. CCK stimulates the pancreas to secrete a number of proteases, specifically trypsin and chymotrypsin, which inactivate CCKRP. CCK also stimulates gallbladder contraction causing bile salts to be released into the intestinal lumen. Bile salts are powerful regulators of CCK, inhibiting its release.

The literature has also shown that CCK release can be stimulated by protein such as whey and casein, hydrolysis products of casein including glycomacropeptide, phenylalanine, calcium and long chain fatty acids.

It has been well documented that some soluble and insoluble fibers as well as plant saponins bind bile salts. Different fibers have different binding capacities to the various bile salts. For instance, cellulose has been shown to bind bile acids poorly. All of the literature to date has shown that regardless of how CCK is stimulated or what intervention is taken to prevent its breakdown, its reported effect is on the termination of the meal.

Previously, it has been shown that a nutritional intervention composition taken as a premeal beverage can reduce hunger and extend satiety following a meal. What is needed is a safe, calorically efficient method by which a nutritional composition can be added to food to increase and extend the satiation quality of that food. In this fashion, by reducing hunger one would improve compliance to a lower calorie regimen. In addition, the method should be simple, economical, easily adapted to a variety of different foods and food forms and does not require professional intervention.

DESCRIPTION OF THE PRIOR ART

U.S. Pat. No. 5,688,547 to Ritchey teaches that a dry food composition that can form a liquid composition is useful as a total meal replacement in connection with weight loss. The invention provides specific benefits derived from regular fiber intake. The critical component of the invention is the addition of up to six grams of fiber. The invention teaches that fiber elicits satiety.

U.S. Pat. No. 4,833,128 to Solomon et al discloses a dietary supplement for the oral administration of phenylalanine in conjunction with protein, carbohydrate and fat to stimulate satiety. This patent teaches that when a dietary supplement containing phenylalanine is consumed fifteen minutes prior to a meal, it generates a feeling of satiety resulting in less food consumption at the subsequent meal. The CCK release slows gastric emptying and the fiber in the invention provides an additional effect by slowing gastric emptying. The nutritional supplement in this patent contains 140 calories and it is recommended that it be taken three times a day. At a dose of three times a day, this dietary supplement would provide almost 25% of the total calories suggested in a reduced caloric program (1600 calories) to lose weight. Furthermore, the addition of phenylalanine limits its use in patients with phenylketonuria. Finally, the patent does not have any effect on extending the duration of action of CCK by inhibiting the action of trypsin and chymotrypsin on CCKRP by the addition of a proteinase inhibitor. In fact, the patent teaches that the appetite suppression of CCK may be merely temporary resulting in a limited satiety effect. This prior art patent does not teach or disclose a method for extending the satiety of food by adding a nutritional composition designed to stimulate CCK.

U.S. Pat. No. 5,290,808 to Sofia discloses a method to control the intake of food. The patent discloses methods and compositions for suppressing the desire for food consumption in animals by the administration of z-phenyl-1, 3-propanediol dicarbamate. This prior art does not teach or disclose a method for extending the satiety of food by adding a nutritional composition designed to stimulate CCK.

U.S. Pat. No. 5,688,547 to Ritchey et al discloses a dry food composition that can form a liquid composition is useful as a total meal replacement in connection with weight loss. This patent provides specific benefits derived from regular fiber intake. The critical component of this prior art patent is the addition of up to six grams of fiber, wherein this patent teaches that fiber elicits satiety. This prior art patent does not teach or disclose a method for extending the satiety of food by adding a nutritional composition to stimulate CCK.

U.S. Pat. No. 5,739,106 to Rink discloses appetite regulating compositions. The patent discloses methods and compositions for reducing food intake, suppressing appetite and controlling body weight. These compositions may include an amylin agonist (amino acid protein hormone) and a CCK agonist or a hybrid peptide. This prior art patent does not teach or disclose a method for extending the satiety of food by adding a nutritional composition designed to stimulate CCK.

U.S. Pat. No. 5,849,708 to Maratos-Flier discloses a method for promoting eating, gaining weight or maintaining weight in a subject. The patent relates to the use of an effective amount of melanocyte concentrating hormone (MCH), MCH agonists and antagonists in regulating eating behavior. This prior art patent does not teach or disclose a method for extending the satiety of food by adding a nutritional composition designed to stimulate CCK.

Accordingly, it is an object of the present invention to provide a nutritional composition that can be added to different foods that will increase and extend the satiation effect of the food.

Another object of the present invention is to provide a nutritional composition that can be added to food that delivers a total meal replacement of only 200–250 calories in a calorically efficient manner.

Another object of the present invention is to provide a nutritional composition that can be added to water, milk, soy milk or juice that delivers a total meal replacement of only 200–250 calories to increase the release of cholecystokinin by stimulating its release through a combination of nutritional agents.

Another object of the present invention is to provide a nutritional composition that can be added to water, milk, soy milk or juice that delivers a total meal replacement of only 200–250 calories to stimulate cholecystokinin release by to bile salts.

Another object of the present invention is to provide a nutritional composition that can be added to water, milk, soy milk or juice that delivers a total meal replacement of only 200–250 calories to cause e weight loss resulting from a reduced caloric intake.

Another object of the present invention is to provide a nutritional composition that can be added to water, milk, soy milk or juice that delivers a total meal replacement of only 200–250 calories to cause weight loss resulting from a reduced caloric intake that is palatable, well tolerated and without side effects to individuals.

Another object of the present invention to provide a nutritional composition that can be added to different foods to increase cholecystokinin by stimulating its release.

Another object of the present invention to provide a nutritional composition that can be added to different foods to stimulate cholecystokinin release by binding to bile salts.

Another object of the present invention to provide a nutritional composition that can be added to different foods to cause weight loss resulting from a reduced caloric intake.

Another object of the present invention to provide a nutritional composition that can be added to different foods to cause weight loss resulting from a reduced caloric intake that is palatable, well tolerated and without side effects to individuals.

Another object of the present invention to provide a nutritional composition that can be added to different foods such as soups, cereals, yogurt and cookies to accomplish the foregoing objects.

SUMMARY OF THE INVENTION

In accordance with the present invention, there is provided a nutritional composition for adding to food for enhancing and extending the satiety of the food by stimulating CCK levels in a calorically efficient manner and for reducing weight. The nutritional composition includes long chain fatty acids ($C_{12}$ to $C_{18}$) being in the range of 1.0 to 6.0 grams by weight of said composition; a source of calcium being in the range of 1.0 to 4.0 grams by weight of said composition; potato fiber being in the range of 1.0 to 6.0 grams by weight of said composition; whey protein enriched with glycomacroprotein being in the range of 1.0 to 5.0 grams by weight of said composition; glucomannan fiber being in the range of 0.5 to 4.0 grams by weight of said composition; guar fiber being in the range of 1.0 to 4.0 grams by weight of said composition; and alfalfa being in the range of 0.05 to 3.0 grams by weight of said composition; wherein the food is selected from the group consisting of carbohydrates, proteins and fats.

A method for extending and enhancing the satiety of food by adding a nutritional composition to the food to stimulate CCK levels in a calorically efficient manner and for reducing weight, wherein the nutritional composition includes long chain fatty acids ($C_{12}$ to $C_{18}$) being in the range of 1.0 to 6.0 grams by weight of said composition; a source of calcium being in the range of 1.0 to 4.0 grams by weight of said composition; potato fiber being in the range of 1.0 to 6.0 grams by weight of said composition; whey protein enriched with glycomacroprotein being in the range of 1.0 to 5.0 grams by weight of said composition; glucomannan fiber being in the range of 0.5 to 4.0 grams by weight of said composition; guar fiber being in the range of 1.0 to 4.0 grams by weight of said composition; and alfalfa being in the range of 0.05 to 3.0 grams by weight of said composition; comprising the step of adding said nutritional composition to a food to stimulate CCK levels.

BRIEF DESCRIPTION OF THE DRAWINGS

Further objects, features, and advantages of the present invention will become apparent upon the consideration of the following detailed description of the presently preferred embodiment when taken in conjunction with the accompanying drawings, wherein.

DETAILED DESCRIPTION OF THE INVENTION

The invention is based on the unexpected and surprising discovery that by adding a nutritional composition to food the satiety of the food is enhanced for up to five hours.

A second unexpected and surprising discovery is that a nutritional composition added to food can reduce caloric consumption in a subsequent meal.

A third unexpected and surprising discovery is that a nutritional composition containing a protein source, long chain fatty acids and calcium is a calorically efficient means for stimulating CCK A fourth unexpected and surprising discovery is that by combining specific soluble and insoluble fibers with plant saponins, one can bind specific bile salts thereby removing a powerful inhibitor of cholecystokinin release.

The nutritional composition of the invention comprises protein in the form of glycomacropeptides (GMP), long chain fatty acids C12–C18 in length, calcium, plant saponins, soluble and insoluble fibers. The nutritional composition can be added to food to produce an extended effect on satiation.

The nutritional composition is designed to achieve multiple effects leading to the increase in satiety by stimulating and maintaining levels of CCK. According to the present invention, stimulation of CCK by meals not only produces satiety but also stimulates negative feedback mechanisms, which turn off the CCK mechanism thereby increasing hunger. An important aspect of the invention is that a combination of elements are used to stimulate CCK and at the same time reduce free levels of bile salts in the intestine so that CCK release is not inhibited.

Soluble fibers, including glucomannan and guar, as well as insoluble fibers, such as cholestyramine, potato and plant saponins from alfalfa and other sources bind those specific bile salts in the intestinal lumen thereby removing a powerful inhibitory factor of CCK release.

Although protein and phenylalanine are strong stimuli for CCK release, studies have shown that a casein glycomacropeptide, which is the first hydrolysis product emptied from the stomach after casein ingestion is a more potent stimulator of CCK release. Since calorie for calorie the nutritional composition of the present invention is a more potent stimulator of CCK release, it is more calorically efficient in producing satiety working through a CCK mechanism. In addition, the protein component including glycomacropeptide may also have an effect on the pancreatic feedback mechanism by serving as a substrate source for the released proteases. This may lower the amount of available proteases to inactivate CCKRP.

Calcium has been shown to stimulate CCK release through a different mechanism than the other CCK stimulating agents in this invention. Typical sources of calcium may be selected from the group consisting of calcium acetate, calcium ascorbate, calcium asparate, calcium caseinate, calcium citrate, calcium glucorate, calcium lactate, calcium succinate and calcium tartrate. Long chain fatty acids are also potent releasers of cholecystokinin. The most effective fatty acids are those between $C_{12}$–$C_{18}$ in length.

The present invention provides for a nutritional composition in a dry powder form for replacing a meal and extending the satiety of the meal.

The nutritional composition also includes a flavor component for imparting a characteristic taste to the meal replacement nutritional composition selected from the group consisting of water soluble, natural or artificial extracts that include apple, banana, cherry, chocolate, cinnamon, coffee, cranberry, grape, honeydew, honey, kiwi, lemon, lime, orange, peach, peppermint, pineapple, raspberry, strawberry, tangerine, vanilla, watermelon, wild cherry and equivalents thereof; being in the range of 1.00 to 3.00 grams by weight of the composition.

The nutritional composition further includes a sweetener component for imparting a characteristic sweet taste to the meal replacement nutritional composition being an artificial sweetener or a natural sugar. Artificial sweeteners are selected from the group consisting of alitame, aspartame, cyclamates, saccharin and xyitol. Natural sugars are selected from the group consisting of glucose, fructose, dextrose, maltose, maltodextrins, lactose, sucrose, corn syrup, honey, maple syrup, molasses, beet sugar, and cane sugar. The sweeteners are in the range of 0.05 to 20.0 grams by weight of the composition.

The active ingredients of the present invention are an oleic acid source, a protein source, a calcium source, a fiber source, a glucomanin, a guar gum and an alfalfa source, as shown in Table 1.

Meal Replacement Products

The above active ingredients can be combined with other food products to make a meal replacement product. Preferably, the caloric total has a range of 200–250 calories. For example, if the active ingredients are added to other ingredients, as shown in Table 2, one example of a meal replacement product would have the ingredients as shown in Table 3. However, the above active ingredients can be combined with other ingredients to make a meal replacement product.

Additives

The active ingredients of Table 1 can be combined with any food product such as yogurt, gelatin dessert, apple sauce, cottage cheese, cereal, bread, soup, protein bars, fruit shakes, candy bars, etc. to produce foods of varying caloric totals, all of which have increased satiation properties, as a result of the total ingredients ingested from that food additive source.

The nutritional composition may be added to drinks selected from the group consisting of apple juice, orange juice, grape juice, grapefruit juice, cranberry juice, coffee, tea, milk, milkshakes, broth, and soup consomme.

Other additives can be used in conjunction with the active ingredients of Table 1, for aiding the user to lose weight. Such additive ingredients may include caffeine in the range of 25 to 200 mg by weight of the composition, chromium picolonate and/or hydroxy citrate.

TABLE 1

| Active Ingredients | g/serv | Percent | Range (gms) Lower | Range (gms) Higher | Percent (%) Lower | Percent (%) Higher |
|---|---|---|---|---|---|---|
| Oleic acid | 4.00 | 25.05 | 1.00 | 6.00 | 3.12 | 56.87 |
| Calcium source | 2.80 | 17.53 | 1.00 | 4.00 | 3.12 | 46.78 |
| Potato Fiber | 3.00 | 18.79 | 1.00 | 6.00 | 3.12 | 56.87 |
| Whey protein enriched with glycomacropeptide | 2.81 | 17.60 | 1.00 | 5.00 | 3.12 | 52.36 |
| Glucomannan Fiber | 1.00 | 6.26 | 0.50 | 4.00 | 1.56 | 44.20 |
| Guar Gum (regular and hydrolyzed) | 2.26 | 14.15 | 1.00 | 4.00 | 3.12 | 46.78 |
| Alfalfa Herb Powder | 0.10 | 0.62 | 0.05 | 3.00 | 0.16 | 35.29 |
| TOTAL Active Ingredients | 15.97 | 100.00 | 5.55 | 32.00 | — | — |

TABLE 2

| Supplemental Ingredients | |
|---|---|
| Maltodextrin | 4.00 |
| Rice starch | 2.00 |
| Non fat milk solids | 0.00 |
| Vitamin/Mineral Premix | 0.20 |
| Lecithin | 0.30 |
| Aspartame | 0.0375 |
| Acesulfame-K | 0.0375 |
| Flavor - Cocoa D-11-S | 6.00 |
| TOTAL Supplemental Ingredients | 12.58 |

TABLE 3

| | g/serv | Percent |
|---|---|---|
| Active Ingredients | | |
| Oleic acid from sunflower oil | 4.00 | 14.01 |
| Calcium source | 2.80 | 9.81 |
| Potato Fiber | 3.00 | 10.51 |
| Whey protein enriched with glycomacropeptide | 2.81 | 9.84 |
| Glucomannan from Konjac Powder | 1.00 | 3.50 |
| Guar Gum (regular and hydrolyzed) | 2.26 | 7.92 |
| Alfalfa Herb Powder | 0.10 | 0.35 |
| TOTAL Active Ingredients | 15.97 | |
| Supplemental Ingredients | | |
| Maltodextrin | 4.00 | 14.01 |
| Rice Starch | 2.00 | 7.01 |
| Non fat milk solids | 0.00 | |

TABLE 3-continued

| | g/serv | Percent |
|---|---|---|
| Vitamin/Mineral Premix | 0.20 | 0.70 |
| Lecithin | 0.30 | 1.05 |
| Aspartame | 0.0375 | 0.14 |
| Acesulfame-K | 0.0375 | 0.14 |
| Flavor - Cocoa D-11-S | 6.00 | 21.02 |
| TOTAL Inactive Ingredients | 12.58 | |
| Total Active and Inactive | 28.55 | 100.00 |

Experiment I

Effect of a Nutritional Composition Meal Replacement Product on Post Meal Satiety Compared to a Conventional Meal Replacement Beverage, and a Placebo Beverage.

Twenty healthy females (Body Mass Index=25–30) were administered either the nutritional composition meal replacement product (NCMRP), a conventional meal replacement beverage (Slim Fast) containing 220 calories, or an isocaloric placebo beverage. The NCMRP, and placebo beverage reconstituted with skim milk contain 220 calories. The subjects were administered three satiety tests. There were at least 2 days between the two tests. In each of the satiety tests subjects drank either 8 oz. of the NCMRP, 8 oz. of the placebo beverage and Slim Fast. Subjects then rated their subjective feelings of hunger, fullness, food consumption and thirst.

On the satiety test days, subjects completed ratings on visual analogue scales on the computer after consuming either the Slim Fast, the placebo beverage or the NCMRP and then every 21 minutes for approximately 5 hours (494 minutes). Subject rated the following:

1. How hungry do you feel right now? (Not at all=0 Extremely=100)
2. How full do you feel right now? (Not at all=0 Extremely=100)
3. How thirsty do you feel right now? (Not at all=0 Extremely=100)
4. How much food would you like to eat right now? (A little=0 A lot=100)

Two-way repeated-measures analyses of variance (ANOVA) were used to evaluate the nutritional composition (NCMRP) being the meal replacement beverage compared to the Slim Fast meal and the placebo beverage on ratings of hunger, food consumption and thirst over time, and subsequent meal caloric intake.

Results

Figure 1:
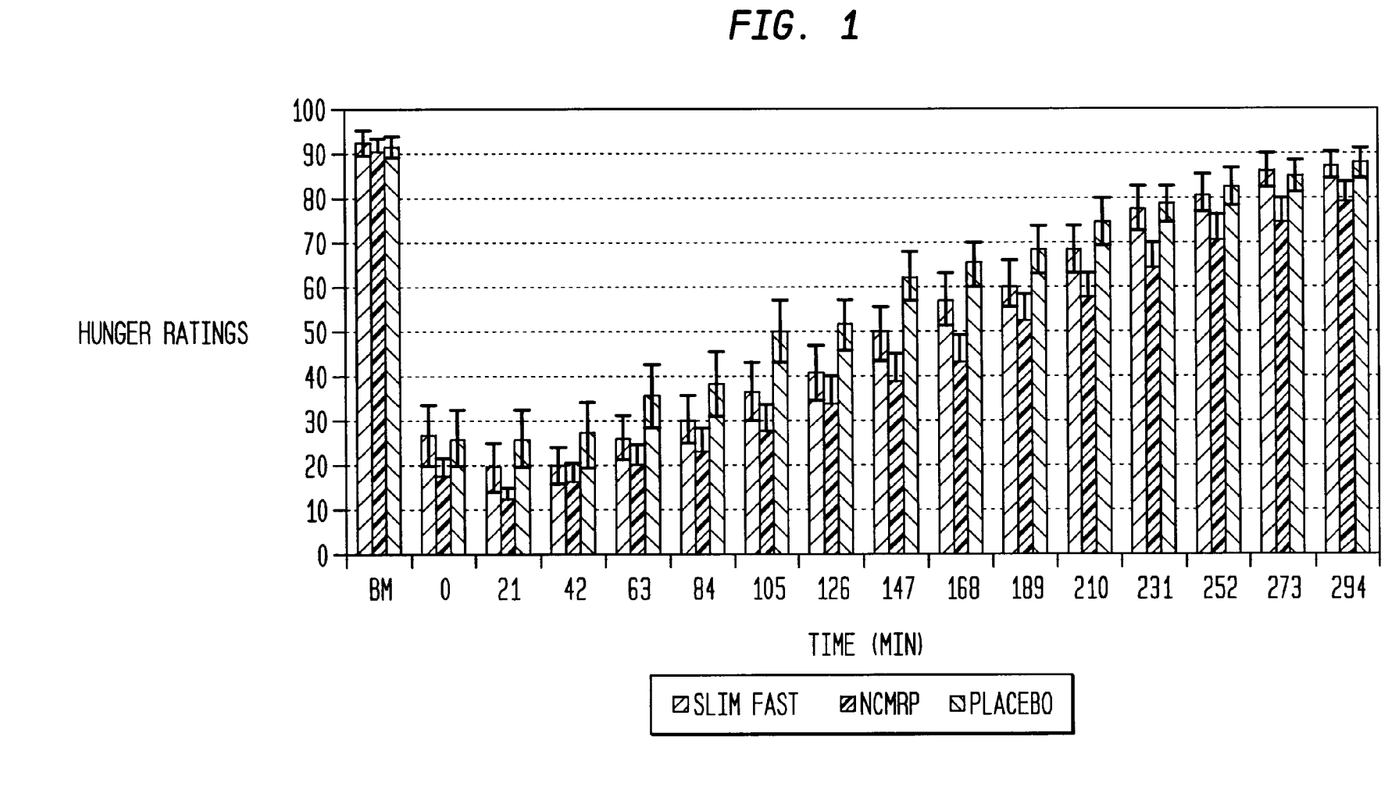
FIG. 1 is a graph comparing hunger ratings over time between the Nutritional Composition Meal Replacement Product (NCMRP), a Conventional Meal Replacement Product (Slim Fast) and a placebo beverage.
Figure 2:
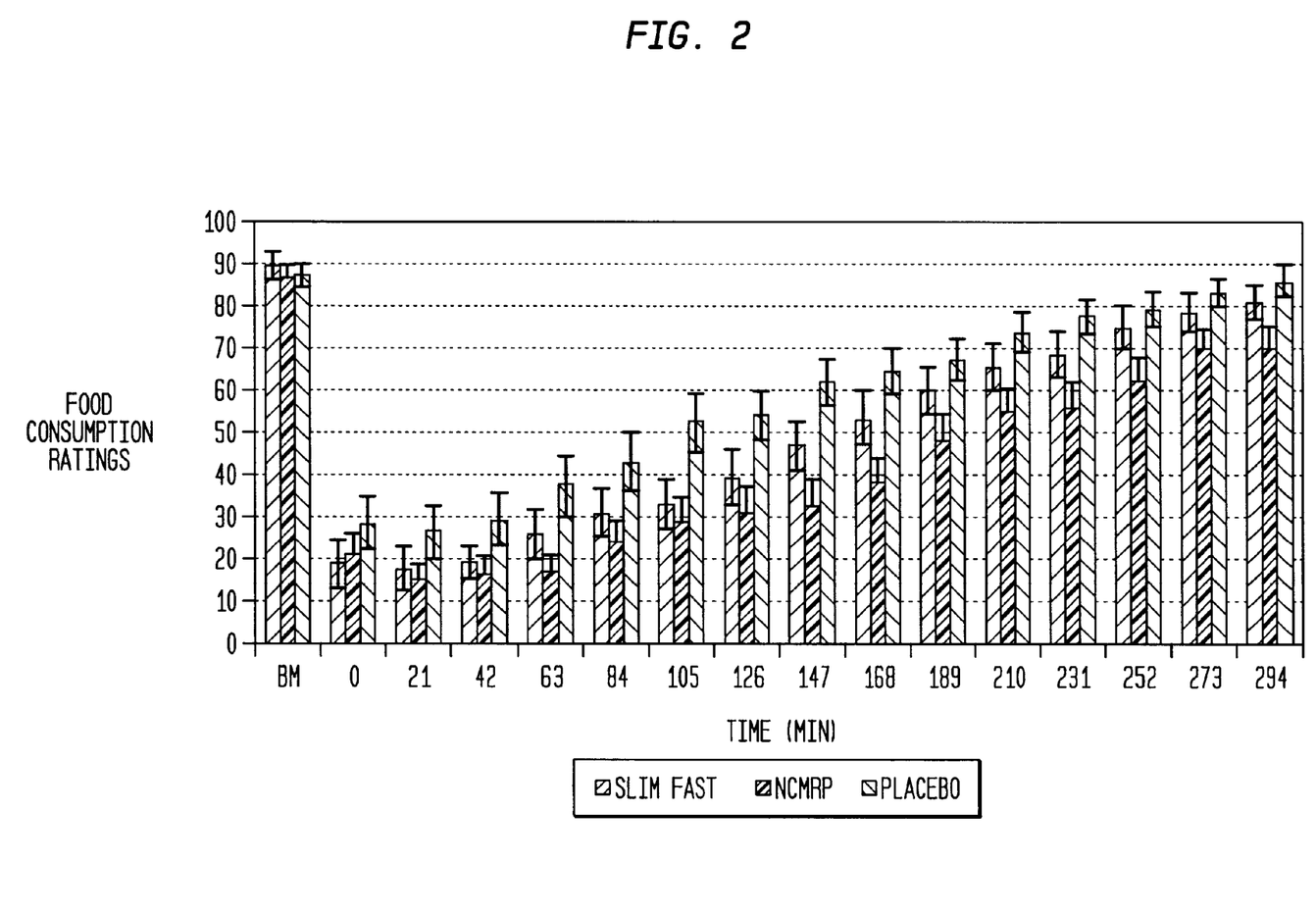
FIG. 2 is a graph comparing food consumption ratings over time between the Nutritional Composition Meal Replacement Product (NCMRP), a Conventional Meal Replacement Product (Slim Fast) and a placebo beverage.
Figure 3:
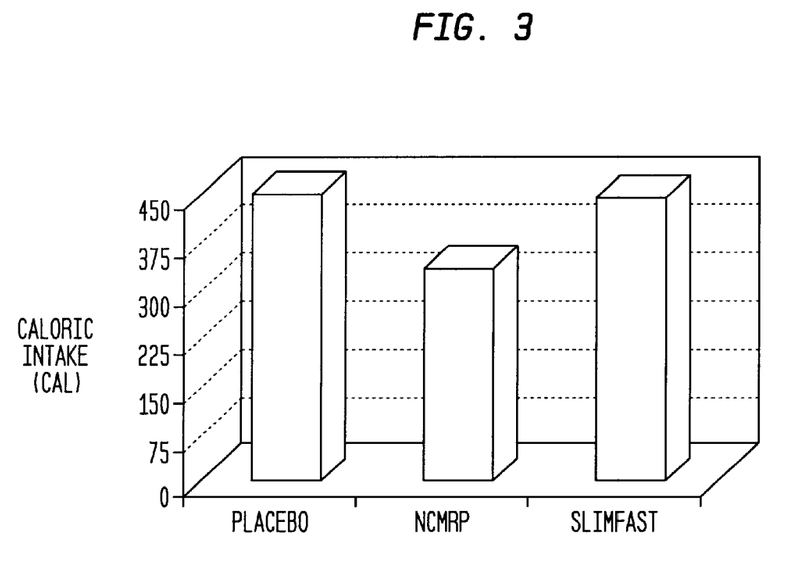
FIG. 3 is a table comparing caloric intake in a subsequent meal between the Nutritional Composition Meal Replacement Product (NCMRP), a Conventional Meal Replacement Product (Slim Fast) and a placebo beverage.

The results indicate the nutritional composition (NCMRP) designed to stimulate CCK, extended satiety when compared to the Slim Fast beverage and the placebo beverage, as shown in FIGS. 1 and 2. There was a significant treatment effect with NCMRP ($p<0.05$) as measured by increase in subjective feelings of food consumption and a decrease in hunger over the post meal evaluation interval of 4 hr. and 93 min. Caloric intake was significantly decreased by 21%, as shown in FIG. 3, when subjects consumed the NCMRP versus the Slim Fast beverage (423 calories vs. 332 calories).

Experiment II

Effect of the Nutritional Composition Meal Replacement Production Post Meal Satiety Compared to an Isocaloric Meal.

Fifteen healthy females (Body Mass Index=25–30) were administered either nutritional composition meal replacement nutritional product (NCMRP) or an isocaloric meal—(Weight Watchers entree) containing 220 calories. The NCMRP reconstituted with skim milk contain 220 calories. The subjects were administered two satiety tests. There were at least 2 days between the two tests. In each of the satiety tests subjects drank 8 oz of the meal replacement beverage on one occasion and the Weight Watchers meal on the other occasion. Subjects then rated their subjective feelings of hunger, fullness, food consumption and thirst.

On the satiety test days, subjects completed ratings on visual analogue scales on the computer after consuming either the Weight Watchers meal or the meal replacement beverage and then every 15 minutes for 3.5 hours. Subjects rated the following:

1. How hungry do you feel right now? (Not at all=0 Extremely=100)
2. How full do you feel right now? (Not at all=0 Extremely=100)
3. How thirsty do you feel right now? (Not at all=0 Extremely=100)
4. How much food would you like to eat right now? (A little=0 A lot=100)

Two-way repeated-measures analyses of variance (ANOVA) were used to evaluate the meal replacement beverage compared to the Weight Watchers meal on ratings of hunger, fullness, food consumption and thirst over time.

Results

Figure 4:
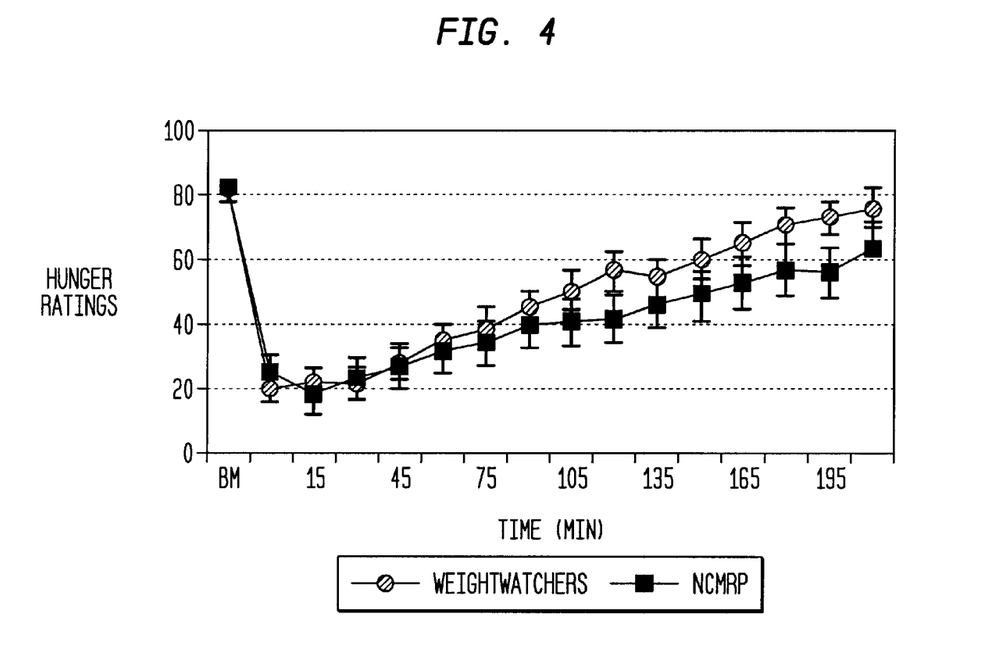
FIG. 4 is a graph comparing hunger ratings over time between the Nutritional Composition Meal Replacement Product (NCMRP) and an Isocaloric Meal (Weight Watchers)
Figure 5:
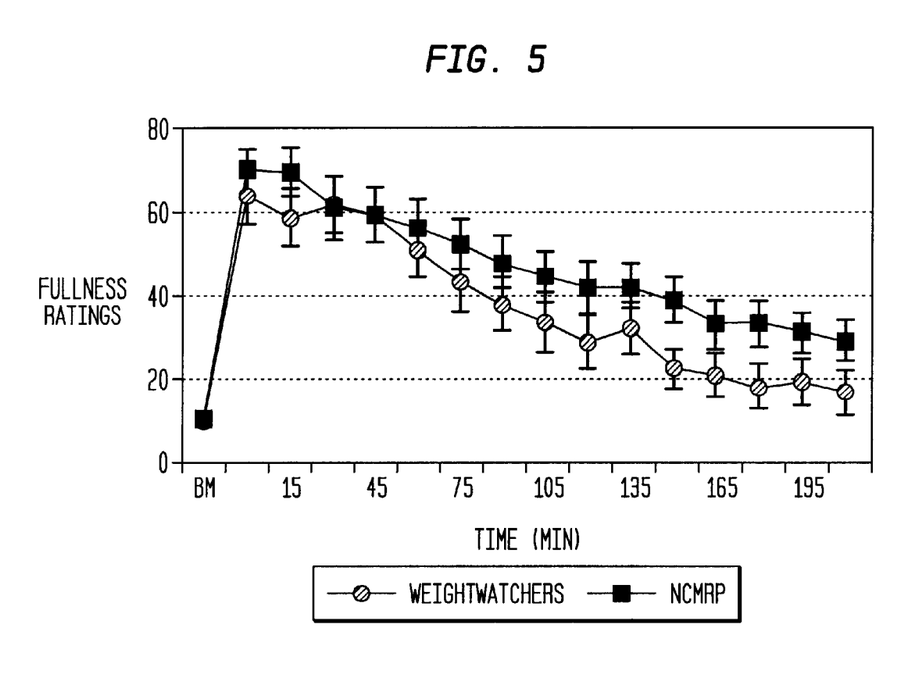
FIG. 5 is a graph comparing fullness ratings over time between the Nutritional Composition Meal Replacement Product (NCMRP) and an Isocaloric Meal (Weight Watchers)
Figure 6:
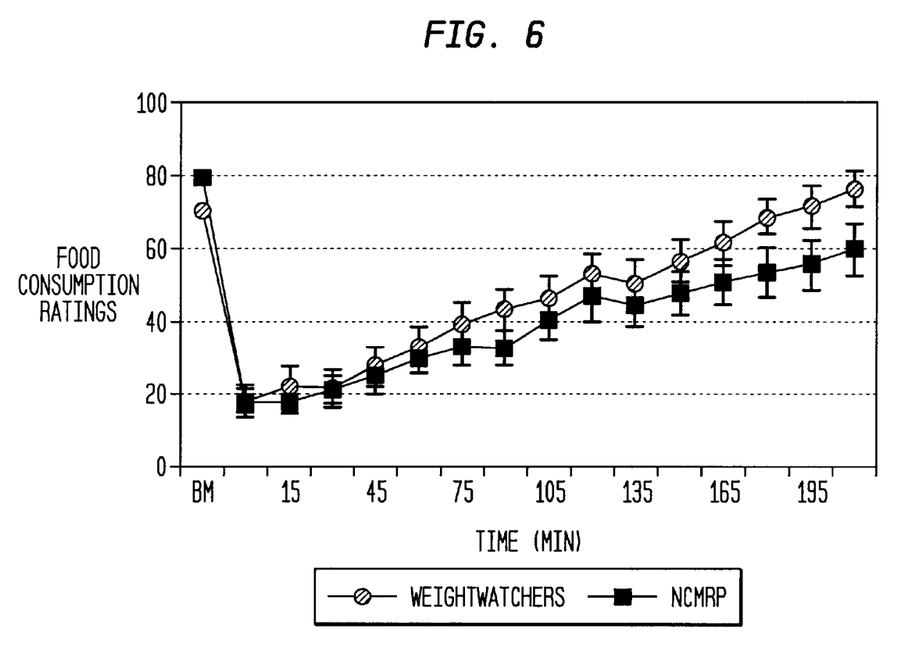
FIG. 6 is a graph comparing food consumption ratings over time between the Nutritional Composition Meal Replacement Product (NCMRP) and an Isocaloric Meal (Weight Watchers)

The results indicate that the NCMRP designed to stimulate CCK, extended satiety when compared to Weight Watchers. There was a significant decrease in hunger (p<0.05) reaching a 23.5% decrease at 195 minutes, as shown in FIG. 4. Similar results were seen in fullness and food consumption ratings. There was a significant increase in subjective ratings of fullness and decrease in food consumption ratings during the post meal measurement interval (p<0.05), as depicted in FIGS. 5 and 6. At 210 minutes there was a 43% increase in fullness and a 28% decrease in food consumption ratings. There was no difference in thirst ratings.

Experiment III

The Effect of a Nutritional Composition Added to Low Fat Yogurt on Post Meal Satiety Ten normal weight subjects (Body Mass Index=24) were administered either an isocaloric-low fat yogurt (ILFY) containing polydextrose or the nutritional composition to low fat yogurt (NCFLY).

Two yogurts were tested. The nutritional composition was blended into 8 oz of Colombo nonfat plain yogurt. Total caloric content of the yogurt with the nutritional composition or placebo was 180 cal. The placebo yogurt contained a calorically equivalent mixture as a nutritional composition consisting of maltodextrin and fructose. Flavorings were added to both yogurts so they were identical in taste.

In each of the satiety tests subjects consumed 8 oz. of the low fat yogurt containing the nutritional composition on one occasion and the placebo mixture on the other occasion. Following consumption of the yogurt subjects rated hunger and fullness using a computer after eating the meal and every 15 minutes for 3.5 hours after the meal.

On the satiety test days, subjects completed ratings on visual analogue scales on the computer after the meal and then every 15 minutes for 3.5 hours after eating the yogurt. Subjects rated the following:

1. How hungry do you feel right now? (Not at all=0 Extremely=100)
2. How full do you feel right now? (Not at all=0 Extremely=100)
3. How thirsty do you feel right now? (Not at all=0 Extremely=100)
4. How much food would you like to eat right now? (A little=0 A lot=100)

Two-way repeated-measures analyses of variance (ANOVA) were used to evaluate the test yogurt compared to the placebo yogurt on ratings of hunger over time after the satiety test meal.

Results

Figure 7:
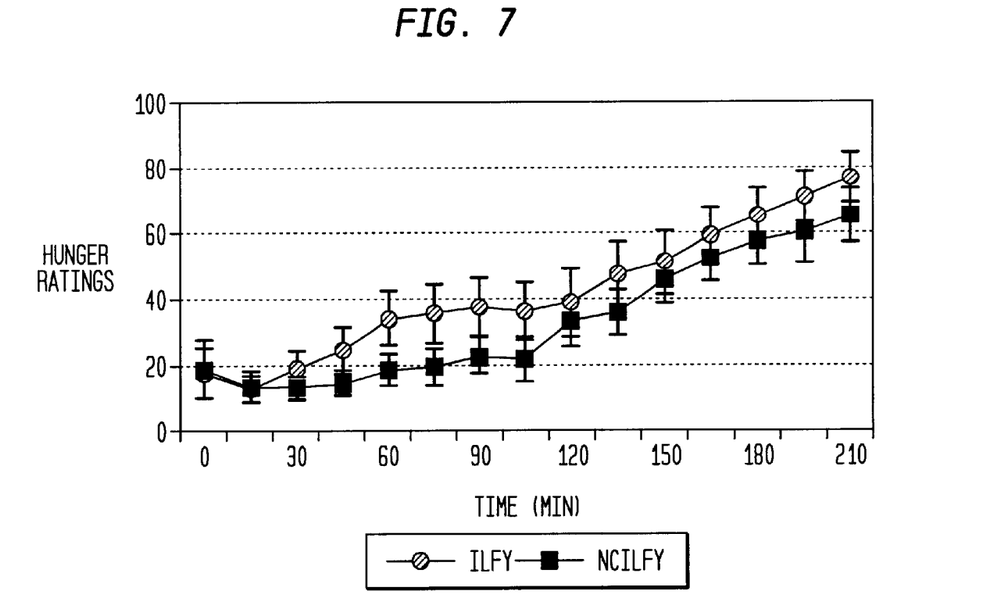
FIG. 7 is a graph comparing hunger ratings over time between the Nutritional Composition added to low fat yogurt (NCLFY) and an Isocaloric Low Fat Yogurt (ILFG)

Hunger ratings following ingestion of the yogurt containing the nutritional composition were significantly decreased throughout the post meal measurement period reaching a peak of 47% at 60 min., as shown in FIG. 7.

Figure 8:
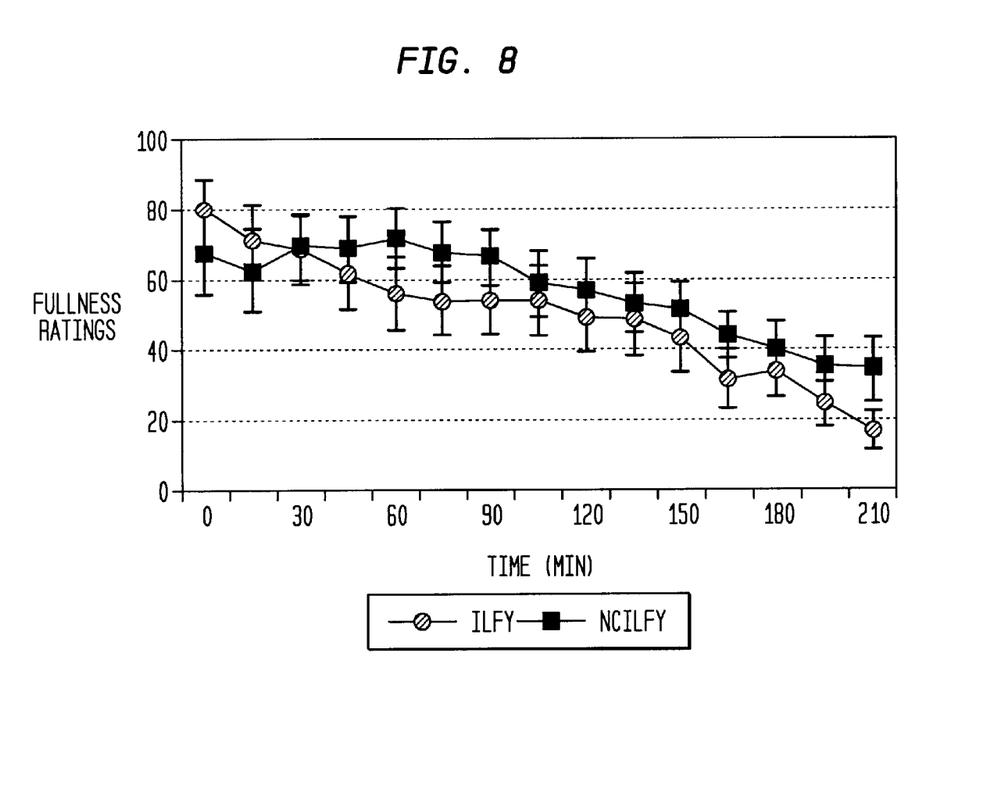
FIG. 8 is a graph comparing fullness ratings over time between the Nutritional Composition added to low fat yogurt (NCLFY) and an Isocaloric Low Fat Yogurt (ILFY)
Figure 9:
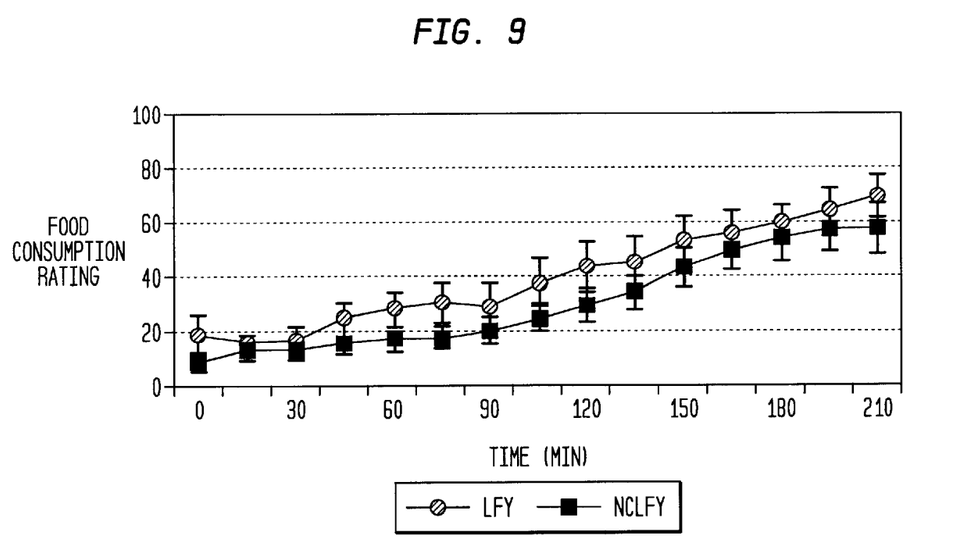
FIG. 9 is a graph comparing food consumption ratings over time between the Nutritional Composition added to low fat yogurt (NCLFY) and an Isocaloric Low Fat Yogurt (ILFY)
Figure 10:
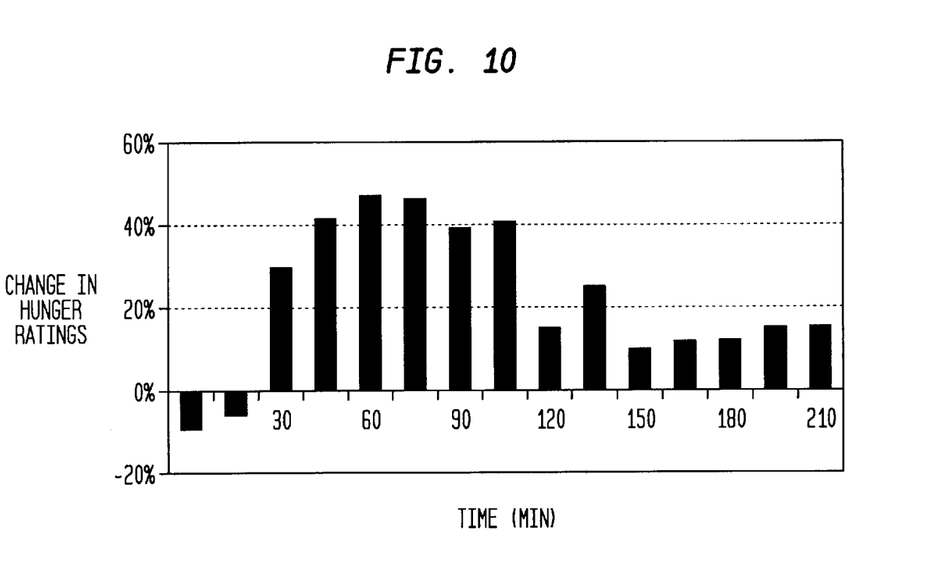
FIG. 10 is a graph showing the change in hunger ratings over time between the Nutritional Composition added to low fat yogurt (NCLFY) and an Isocaloric Low Fat Yogurt (ILFY).

At 135 minutes hunger ratings were 25% lower in the group consuming the test yogurt. Hunger ratings for the test yogurt were significantly lower at 45, 60, 75, 90, 105 and 120 minutes. Consistent with this finding food consumption ratings, as shown in FIG. 9, were significantly less throughout the post meal measurement period. The differences were significant at p<0.05. Fullness ratings showed a similar trend, as depicted in FIG. 8. There was no difference with regard to thirst ratings between the test beverage and the placebo. As shown in FIG. 10, the change in hunger ratings reached 47% at 60 minutes and were significantly different than the isocaloric low fat yogurt at 45, 60, 75, 90, 105, 120 and 135 minutes.

The results of this study showed that the nutritional composition when added to a food such as low fat yogurt extended the satiating qualities of that food.

ADVANTAGES OF THE PRESENT INVENTION

Accordingly, an advantage of the present invention is that it provides for a nutritional composition that can be added to different foods that will increase and extend the satiation effect of the food.

Another advantage of the present invention is that it provides for a nutritional composition that can be added to food that delivers a total meal replacement of only 200–250 calories in a calorically efficient manner.

Another advantage of the present invention is that it provides for a nutritional composition that can be added to water, milk, soy milk or juice that delivers a total meal replacement of only 200–250 calories to increase the release of cholecystokinin by stimulating its release through a combination of nutritional agents.

Another advantage of the present invention is that it provides for a nutritional composition that can be added to water, milk, soy milk or juice that delivers a total meal replacement of only 200–250 calories to stimulate cholecystokinin release by binding to bile salts.

Another advantage of the present invention is that it provides for a nutritional composition that can be added to water, milk, soy milk or juice that delivers a total meal replacement of only 200–250 calories to cause weight loss resulting from a reduced caloric intake.

Another advantage of the present invention is that it provides for a nutritional composition that can be added to water, milk, soy milk or juice that delivers a total meal replacement of only 200–250 calories to cause weight loss resulting from a reduced caloric intake that is palatable, well tolerated and without side effects to individuals.

Another advantage of the present invention is that it provides for a nutritional composition that can be added to different foods to increase cholecystokinin by stimulating its release.

Another advantage of the present invention is that it provides for a nutritional composition that can be added to different foods to stimulate cholecystokinin release by binding to bile salts.

Another advantage of the present invention is that it provides for a nutritional composition that can be added to different foods to cause weight loss resulting from a reduced caloric intake.

Another advantage of the present invention is that it provides for a nutritional composition that can be added to different foods to cause weight loss resulting from a reduced caloric intake that is palatable, well tolerated and without side effects to individuals.

Another advantage of the present invention is that it provides for a nutritional composition that can be added to different foods such as soups, cereals, yogurt and cookies. to accomplish the foregoing objects.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A nutritional composition for adding to food for enhancing and extending the satiety of the food thereby aiding the user to lose weight, comprising:
   a) long chain fatty acids ($C_{12}$ to $C_{18}$) being in the range of 1.0 to 6.0 grams by weight of said composition;
   b) a source of calcium being in the range of 1.0 to 4.0 grams by weight of said composition;
   c) potato fiber being in the range of 1.0 to 6.0 grams by weight of said composition;
   d) whey protein enriched with glycomacroprotein, said enriched whey protein being in the range of 1.0 to 5.0 grams by weight of said composition;
   e) glucomannan fiber being in the range of 0.5 to 4.0 grams by weight of said composition;
   f) guar fiber being in the range of 1.0 to 4.0 grams by weight of said composition; and
   g) alfalfa being in the range of 0.05 to 3.0 grams by weight of said composition;
      wherein the total weight of said composition, including optional ingredients, being in the range of 5.55 to 32.0 grams.

2. A nutritional composition in accordance with claim 1, wherein said long chain fatty acids are 4.0 grams by weight of said composition.

3. A nutritional composition in accordance with claim 1, wherein said source of calcium is 2.80 grams by weight of said composition.

4. A nutritional composition in accordance with claim 1, wherein said potato fiber is 3.0 grams by weight of said composition.

5. A nutritional composition in accordance with claim 1, wherein said whey protein enriched with glycomacropeptide is 2.81 grams by weight of said composition.

6. A nutritional composition in accordance with claim 1, wherein said glucomannan fiber is 1.00 gram by weight of said composition.

7. A nutritional composition in accordance with claim 1, wherein said guar fiber is 2.26 grams by weight of said composition.

8. A nutritional composition in accordance with claim 1, wherein said alfalfa is 0.10 grams by weight of said composition.

9. A nutritional composition in accordance with claim 1, wherein said composition is in the form of a dry powder.

10. A nutritional composition in accordance with claim 1, wherein said composition is added to a liquid to form a liquid drink.

11. A nutritional composition in accordance with claim 1, wherein said composition is part of a protein bar or candy bar.

12. A nutritional composition is accordance with claim 1, wherein said long chain fatty acids are oleic acid or other $C_{12}$ to $C_{18}$ fatty acids.

13. A nutritional composition in accordance with claim 1, wherein said source of calcium is selected from the group consisting of calcium acetate, calcium ascorbate, calcium asparate, calcium caseinate, calcium citrate, calcium gluconate, calcium lactate, calcium succinate and calcium tartrate.

14. A nutritional composition is accordance with claim 1, wherein said glucomannan fiber is from konjac powder.

15. A nutritional composition is accordance with claim 1, wherein said guar fiber is from guar gum.

16. A nutritional composition in accordance with claim 1, wherein said glucomannan fiber and said guar fiber are soluble fibers for binding bile salts.

17. A nutritional composition in accordance with claim 1, wherein said alfalfa is a source of plant saponins for binding bile salts.

18. A method for extending and enhancing the satiety of food by adding a nutritional composition to the food to aid the user to lose weight, wherein the nutritional composition comprises:
   a) long chain fatty acids ($C_{12}$ to $C_{18}$) being in the range of 1.0 to 6.0 grams by weight of said composition;
   b) a source of calcium being in the range of 1.0 to 4.0 grams by weight of said composition;
   c) potato fiber being in the range of 1.0 to 6.0 grams by weight of said composition;
   d) whey protein enriched with glycomacroprotein, said enriched whey protein being in the range of 1.0 to 5.0 grams by weight of said composition;
   e) glucomannan fiber being in the range of 0.5 to 4.0 grams by weight of said composition;
   f) guar fiber being in the range of 1.0 to 4.0 grams by weight of said composition; and
   g) alfalfa being in the range of 0.05 to 3.0 grams by weight of said composition;
      wherein the total weight of said composition, including optional ingredients, being in the range of 5.55 to 32.0 grams.

19. A method in accordance with claim 18, wherein said long chain fatty acids are 4.0 grams by weight of said composition.

20. A method in accordance with claim 18, wherein said source of calcium is 2.80 grams by weight of said composition.

21. A method in accordance with claim 18, wherein said potato fiber is 3.0 grams by weight of said composition.

22. A method in accordance with claim 18, wherein said whey protein enriched with glycomacropeptide is 2.81 grams by weight of said composition.

23. A method in accordance with claim 18, wherein said glucomannan fiber is 1.00 gram by weight of said composition.

24. A method in accordance with claim 18, wherein said guar fiber is 2.26 grams by weight of said composition.

25. A method in accordance with claim 18, wherein said alfalfa is 0.10 grams by weight of said composition.

26. A method in accordance with claim 18, wherein said composition is in the form of a dry powder.

27. A method in accordance with claim 18, wherein said composition is added to a liquid to form a liquid drink.

28. A method in accordance with claim 18, wherein n said composition is part of a protein bar or candy bar.

29. A method in accordance with claim 18, wherein said long chain fatty acids are oleic acid or other $C_{12}$ to $C_{18}$ fatty acids.

30. A method in accordance with claim 18, wherein said source of calcium is selected from the group consisting of calcium acetate, calcium ascorbate, calcium asparate, calcium caseinate, calcium citrate, calcium gluconate, calcium lactate, calcium succinate and calcium tartrate.

31. A method in accordance with claim 18, wherein said glucomannan fiber is from konjac powder.

32. A method in accordance with claim 18, wherein said guar fiber is from guar gum.

33. A method in accordance with claim 18, wherein said glucomannan fiber and said guar fiber are soluble fibers for binding bile salts.

34. A method in accordance with claim 18, wherein said alfalfa is a source of plant saponins for binding bile salts.

35. A method in accordance with claim 18, wherein said composition is added to other foods.

36. A method in accordance with claim 35, wherein said foods are selected from the group consisting of yogurt, gelatin dessert, apple sauce, cottage cheese, cereal, bread, and candy bars.

37. A method in accordance with claim 35, wherein said foods are drinks selected from the group consisting of apple juice, orange juice, grape juice, grapefruit juice, cranberry juice, coffee, tea, milk, milkshakes, broth and soup consomme.

* * * * *

UNITED STATES PATENT AND TRADEMARK OFFICE
CERTIFICATE OF CORRECTION

PATENT NO.      : 6,429,190 B1
DATED           : August 9, 2002
INVENTOR(S)     : Robert Portman

It is certified that error appears in the above-identified patent and that said Letters Patent is hereby corrected as shown below:

Column 1,
Line 5, in the first sentence following the title, please insert the following paragraph:

-- RELATED APPLICATIONS
This application is a continuation-in-part of U.S. patent application Serial No. 09/510,809, filed February 23, 2000, now U.S. Patent No. 6,207,638, issued March 27, 2001 --

Signed and Sealed this

Seventh Day of January, 2003

JAMES E. ROGAN
*Director of the United States Patent and Trademark Office*